United States Patent [19]

Zysk et al.

[11] 3,836,402

[45] Sept. 17, 1974

[54] MOLYBDENUM-RUTHENIUM THERMOCOUPLE FOR TEMPERATURE MEASUREMENTS UNDER NUCLEAR REACTION CONDITIONS

[75] Inventors: Edward D. Zysk, Livingston; Allen R. Robertson, Edison; Michael Cisz, Irvington; Robert W. Sheridan, Glen Rock, all of N.J.

[73] Assignee: Engelhard Minerals & Chemicals Corporation, Murray Hill, N.J.

[22] Filed: Aug. 28, 1972

[21] Appl. No.: 283,953

[52] U.S. Cl. .............................. 136/202, 136/236
[51] Int. Cl. ............................................. H01v 1/22
[58] Field of Search .............. 136/236, 202; 176/80, 176/19 R, 68

[56] References Cited
UNITED STATES PATENTS

| 3,049,577 | 8/1962 | Hill | 136/236 |
| 3,050,575 | 8/1962 | Sullivan | 136/202 |
| 3,081,365 | 3/1963 | Henderson et al. | 136/236 X |
| 3,194,657 | 7/1965 | Betteridge | 75/172 |
| 3,466,200 | 9/1969 | Mellor et al. | 136/236 X |

OTHER PUBLICATIONS

Nadler et al., "The Review of Scientific Instruments," 32, No. 1, 43–47 (1961).

Holmes, "Nuclear Science Abstracts," 15, abs. No. 29400, (1961). QC 770 N96.

Primary Examiner—Carl D. Quarforth
Assistant Examiner—E. A. Miller

[57] ABSTRACT

A thermocouple suitable for use under high temperature conditions in nuclear reactors and other environments where neutron irradiation exists, one element of the thermocouple being composed essentially of molybdenum and the other element essentially of ruthenium.

1 Claim, 1 Drawing Figure

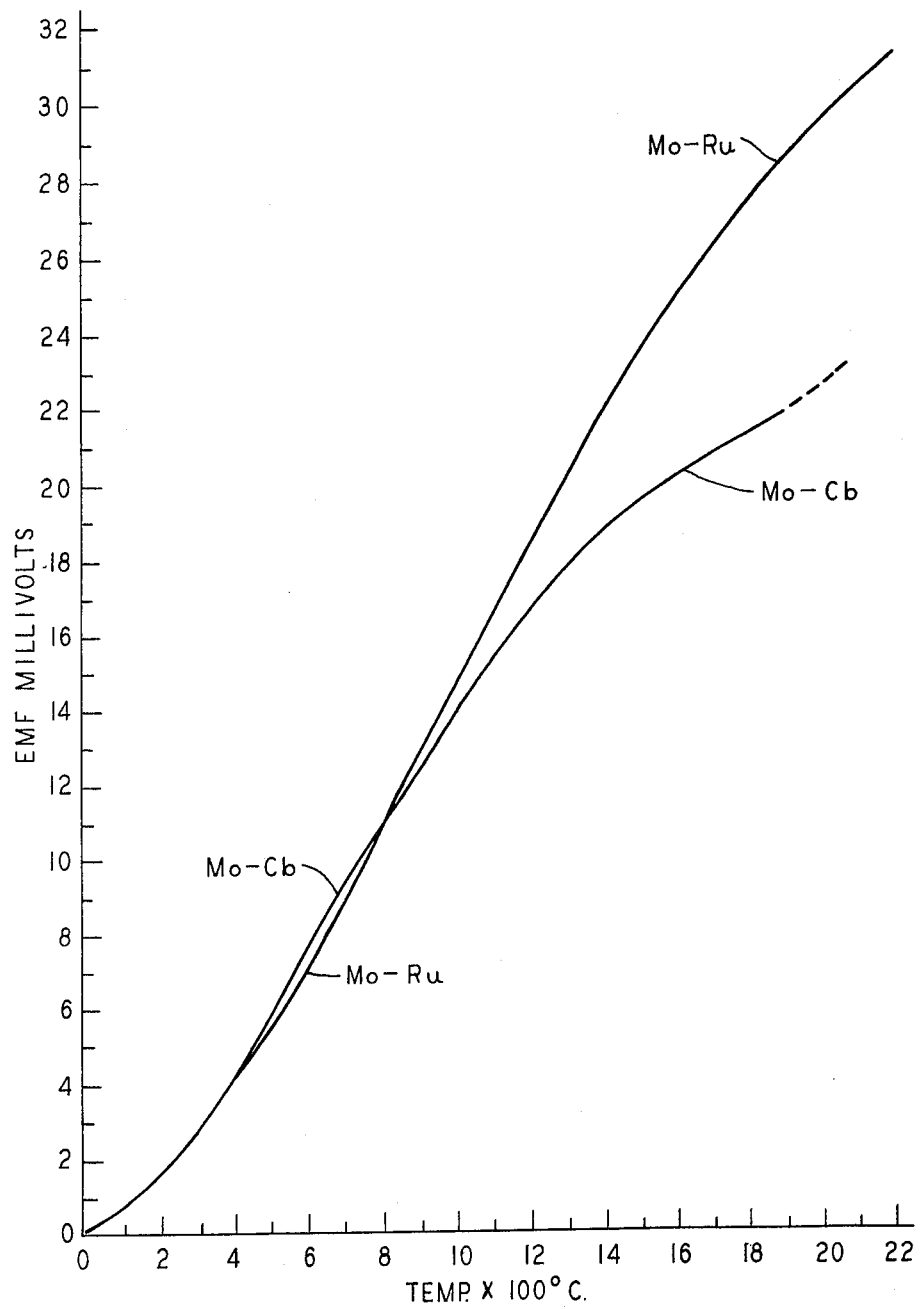

MOLYBDENUM-RUTHENIUM THERMOCOUPLE FOR TEMPERATURE MEASUREMENTS UNDER NUCLEAR REACTION CONDITIONS

BACKGROUND OF THE INVENTION

The operation of nuclear reactors requires that the temperature within the reactor be accurately measured and controlled. Accurate temperature measurements under nuclear reaction conditions are, however, not easily obtained. Thermocouples designed for use in such environments must function satisfactorily at relatively high temperatures, e.g. from about 1,000° C. to at least 2,000° C., and must have a thermal EMF which is not adversely affected under high neutron irradiation.

Thermocouples provide the only practical means of measuring and controlling temperature accurately in nuclear reactor operations or in the in-pile testing of reactor materials. During such usage, the thermocouple may be subjected to neutron flux for long periods of time and may undergo nuclear reactions which change its composition and consequently its thermoelectric characteristics.

The extent of change induced in the thermocouple depends upon the neutron flux, the exposure time to irradiation, the neutron capture cross-section of the constituents of the couple, and the half life of the isotopes formed. The neutron capture cross-section of a nucleus is expressed in terms of square centimeters and usually, for convenience, in the terms of barns (1 barn being equal to $10^{-24} cm^2$) and indicates the probability per unit flux and unit time of a nucleus capturing an incident particle. Transmutation from one element to another results when a nuclear reaction produces a radioactive isotope which then decays into an isotope of a different element. In some cases, a nuclear reaction produces an isotope which is not radioactive. This does not result in transmutation until the isotope undergoes another nuclear reaction and produces a radioactive isotope. The net result of the transmutation from one element to another is a change in composition of the material under irradiation. In the case of a thermocouple material, any change in composition will result in a change in EMF. Thus, a tungsten-rhenium thermocouple useful under ordinary high temperature conditions is not satisfactory under conditions of high neutron flux since the elements transmute to osmium and the thermal EMF of the couple changes rather rapidly. On the other hand, platinum— 5% molybdenum versus platinum — 0.1% molybdenum has been suggested for measurement of temperature in nuclear reactors, but such thermocouple is useful only up to about 1,500° C. and possibly for very short periods up to about 1,700° C., which latter temperature is extremely close to the melting point of the platinum — 0.1% molybdenum element.

Also suggested is a molybdenum-columbium thermocouple which is fairly stable under neutron irradiation conditions at lower temperatures up to about 1,000°C., but this combination has an appreciable drop off in its sensitivity at higher temperatures, and the EMF vs. temperature values are appreciably lower than that of the molybdenum-ruthenium thermocouple herein contemplated.

SUMMARY OF THE INVENTION

A thermocouple suitable for use under high temperature conditions in nuclear reactors and other environments where neutron irradiation exists, one element of the thermocouple being composed essentially of molybdenum and the other element essentially of ruthenium. The thermocouple is especially useful for temperature measurements under nuclear irradiation conditions in the higher temperature range of from about 1,000° C. to 2,000° C. and possibly 2,150° C. without undergoing adverse response effects and degradation due to nuclear irradiation at the high temperatures.

DESCRIPTION OF THE DRAWING

The single FIGURE graphically illustrates a comparison of the EMF v. temperature values of a molybdenum-ruthenium thermocouple compared with a molybdenum-columbium thermocouple over the range of 0° C. to 2,000° C.

DESCRIPTION OF THE PREFERRED EMBODIMENTS

In accordance with the invention there is provided a thermocouple combination of molybdenum vs. ruthenium which meets the requirements for a high temperature thermocouple operable over the range of 0° C. to 2,000° C. and possibly to 2,150° C. for use in nuclear reactors or environments of high temperature thermal neutron irradiation, especially in the range of 1,000° C. to 2,000° C.

The thermocouple elements molybdenum and ruthenium are not adversely effected by nuclear irradiation and they have high melting points of 2,610° C. for molybdenum and 2,310° C. for ruthenium and also low thermal neutron capture cross-sections of 2.5 barns for molybdenum and 2.5 barns for ruthenium as well as good sensitivity (EMF response) at elevated temperatures when combined into a thermocouple.

In addition, the molybdenum vs. ruthenium combination has high EMF vs. temperature characteristics and its curve, as illustrated in the FIGURE, is almost linear, whereas the molybdenum vs. columbium combination taken in comparison, also illustrated in the FIGURE, has lower EMF sensitivity and has an appreciable drop off in the higher temperature range of from about 1,000° C. to 2,000° C.

The following TABLE further illustrates the EMF vs. temperature response of the molybdenum vs. ruthenium thermocouple in comparison with the molybdenum vs. columbium thermocouple.

TABLE

| EMF in Millivolts Temp. °C. | Reference Junction 0°C. | |
|---|---|---|
| | Molybdenum vs. Ruthenium | Molybdenum vs. Columbium |
| 0 | 0.00 | 0.00 |
| 100 | 0.64 | 0.64 |
| 200 | 1.59 | 1.62 |
| 300 | 2.78 | 2.87 |
| 400 | 4.18 | 4.33 |
| 500 | 5.73 | 5.91 |
| 600 | 7.39 | 7.55 |
| 700 | 9.12 | 9.22 |
| 800 | 10.89 | 10.87 |
| 900 | 12.67 | 12.46 |
| 1000 | 14.43 | 14.06 |
| 1100 | 16.14 | 15.47 |
| 1200 | 18.28 | 16.74 |

TABLE-Continued

| EMF in Millivolts Temp. °C. | Reference Junction 0°C. | |
|---|---|---|
| | Molybdenum vs. Ruthenium | Molybdenum vs. Columbium |
| 1300 | 20.05 | 17.83 |
| 1400 | 21.81 | 18.80 |
| 1500 | 23.3 | 19.60 |
| 1600 | 24.8 | 20.27 |
| 1700 | 26.3 | 20.88 |
| 1800 | 27.5 | 21.42 |
| 1900 | 28.8 | 21.97 |
| 2000 | 29.8 | 22.77 |

Thus, it will be seen from the foregoing description that the molybdenum vs. ruthenium thermocouple of the invention is very well suitable for use in the measurement of high temperature under nuclear irradiation conditions.

What is claimed is:

1. A thermocouple suitable for use in the measurement of temperatures under conditions of neutron irradiation wherein one element of the thermocouple is composed essentially of molybdenum and the other element of the thermocouple is composed essentially of ruthenium.

* * * * *